(12) United States Patent
Takahashi

(10) Patent No.: US 11,114,920 B2
(45) Date of Patent: Sep. 7, 2021

(54) POWER GENERATOR

(71) Applicant: HONDA MOTOR CO., LTD., Tokyo (JP)

(72) Inventor: Chisako Takahashi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 35 days.

(21) Appl. No.: 16/665,208

(22) Filed: Oct. 28, 2019

(65) Prior Publication Data
US 2020/0212765 A1 Jul. 2, 2020

(30) Foreign Application Priority Data
Dec. 28, 2018 (JP) .............................. JP2018-246830

(51) Int. Cl.
| | |
|---|---|
| *H02K 7/18* | (2006.01) |
| *H02K 11/04* | (2016.01) |
| *H02K 9/06* | (2006.01) |
| *H02K 5/18* | (2006.01) |
| *H02K 5/24* | (2006.01) |
| *F02B 63/04* | (2006.01) |

(52) U.S. Cl.
CPC ......... *H02K 7/1815* (2013.01); *F02B 63/048* (2013.01); *H02K 5/18* (2013.01); *H02K 5/24* (2013.01); *H02K 9/06* (2013.01); *H02K 11/046* (2013.01); *F02B 2063/046* (2013.01); *H02K 2205/09* (2013.01)

(58) Field of Classification Search
CPC ............. F02B 2063/046; F02B 63/048; H02K 11/046; H02K 2205/09; H02K 5/18; H02K 5/24; H02K 7/1815; H02K 9/06
USPC .......................................................... 310/52
See application file for complete search history.

(56) References Cited

U.S. PATENT DOCUMENTS

| | | | | |
|---|---|---|---|---|
| 6,792,897 | B2 * | 9/2004 | Higuchi ................... | F02B 63/04 123/2 |
| 7,414,339 | B2 * | 8/2008 | Kitamura ............. | H02K 11/048 310/68 D |
| 2015/0303765 | A1 * | 10/2015 | Akiyoshi ................. | H02K 5/20 310/59 |
| 2016/0281597 | A1 * | 9/2016 | Kase .......................... | F02N 3/02 |
| 2017/0271942 | A1 * | 9/2017 | Koyama ................... | F01P 1/06 |

FOREIGN PATENT DOCUMENTS

JP        2000-328956        11/2000

\* cited by examiner

*Primary Examiner* — Alex W Mok
(74) *Attorney, Agent, or Firm* — Rankin, Hill & Clark LLP

(57) ABSTRACT

In the power generator, an alternator driven by an engine to generate power, an inverter for the alternator, a fan to cool the engine, and a shroud via which air blown by the fan is guided to a periphery of the engine are stored inside of a casing. A fan cover that covers the alternator and the fan is provided in an end portion of the shroud, a ventilating opening is formed in an end portion of the fan cover, and an inverter supporter in which the inverter is installed is provided in a circumferential edge portion of the ventilating opening.

7 Claims, 6 Drawing Sheets

POWER GENERATOR

INCORPORATION BY REFERENCE

The present application claims priority under 35 U.S.C. § 119 to Japanese Patent Application No. 2018-246830 filed on Dec. 28, 2018. The content of the applications is incorporated herein by reference in its entirety.

BACKGROUND OF THE INVENTION

Field of the Invention

The present invention relates to a power generator, and in particular, a power generator that is capable of efficiently cooling an inverter.

Description of the Related Art

Heretofore, there has been known a power generator that rotates an alternator by rotation of an output shaft of an engine to generate power.

An inverter to control the alternator is mounted in the power generator. The inverter causes heat generation, and hence, heat needs to be dissipated.

As this power generator, a technology has heretofore been disclosed in which, for example, a fan cover is formed by die casting of an aluminum alloy, a power control circuit is formed in an aluminum substrate to constitute a power control unit, an aluminum substrate surface of this power control unit is brought into contact closely with and attached to an outer surface of the fan cover, and heat of the power control unit is dissipated with the fan cover (e.g., see Japanese Patent Laid-Open No. 2000-328956).

SUMMARY OF THE INVENTION

However, in the above conventional technology, an inverter (a power control unit) and a fan cover are separate units, and a space in which the inverter is to be installed needs to be provided in a casing of a power generator. Consequently, there is a problem that the power generator cannot be reduced in size and weight.

The present invention has been developed in view of the above described problem. It is an object of the present invention to provide a power generator that can save a space in which an inverter is to be installed, and can be reduced in size and weight.

To achieve the above object, according to an aspect of the present invention, there is provided a power generator in which an alternator driven by an engine to generate power, an inverter for the alternator, a fan to cool the engine, and a shroud via which air blown by the fan is guided to a periphery of the engine are stored inside of a casing, wherein a fan cover that covers the alternator and the fan is provided in an end portion of the shroud, a ventilating opening is formed in an end portion of the fan cover, and an inverter supporter in which the inverter is installed is provided in a circumferential edge portion of the ventilating opening.

According to the aspect of the present invention, the air taken in the casing by driving the fan is directly applied to the inverter to cool the inverter. Furthermore, the inverter can be efficiently cooled by heat conduction of the fan cover cooled by the air passing through the ventilating opening.

In the above configuration, the inverter supporter is formed in an annular shape along the ventilating opening, and the inverter is installed along a circumferential direction of the inverter supporter.

According to the aspect of the present invention, the inverter installed along the ventilating opening can be efficiently cooled.

In the above configuration, the inverter supporter is formed in a region of a part of the ventilating opening in a circumferential direction, and the inverter is installed in the inverter supporter.

According to the aspect of the present invention, the inverter formed in the region of the part of the ventilating opening in the circumferential direction can be efficiently cooled. Furthermore, since the inverter supporter is formed in the region of the part, a substrate of the inverter can be formed in a shape close to a rectangle. Consequently, it is possible to easily design the substrate of the inverter.

In the above configuration, a cooling fin is provided on an inner peripheral surface of the ventilating opening.

According to the aspect of the present invention, the cooling fin can increase a contact area between the fan cover and the air passing through the ventilating opening. Consequently, the fan cover can be more efficiently cooled.

In the above configuration, a vibration reduction member made of an elastic material is provided between the fan cover and the shroud.

According to the aspect of the present invention, vibration of an engine can be prevented from being transmitted to the inverter, and an element mounted in the inverter can be prevented from being damaged. Furthermore, since the fan cover is attached to the shroud via the vibration reduction member, radiated sound due to the transmission of the vibration of the engine can be reduced.

In the above configuration, a recoil to start the engine is attached to the fan cover.

According to the aspect of the present invention, the recoil is attached to the fan cover in which the vibration is reduced by the vibration reduction member, and hence, vibration of the recoil can be decreased. As a result, a space to allow for the vibration of the recoil does not have to be provided, and the power generator can be miniaturized. Furthermore, when the power generator is miniaturized, a recoil rope that operates the recoil can be shortened, and the recoil rope can be easily handled.

According to the aspect of the present invention, air taken in a casing by driving a fan is directly applied to an inverter to cool the inverter. Furthermore, the inverter can be efficiently cooled by heat conduction of a fan cover cooled by the air passing through a ventilating opening.

Additionally, the inverter is cooled by an inverter supporter of the fan cover. Consequently, a cooling fin to cool the inverter as in a conventional technology is not required, and the inverter itself can be miniaturized. A power generator can be reduced in size and weight.

In addition, the inverter is installed in the inverter supporter provided in the fan cover, and hence, a space for exclusive use to install the inverter does not have to be acquired. The power generator can be reduced in size and weight.

DETAILED DESCRIPTION OF THE PREFERRED EMBODIMENTS

Hereinafter, embodiments of the present invention will be described with reference to the drawings.

Figure 1:
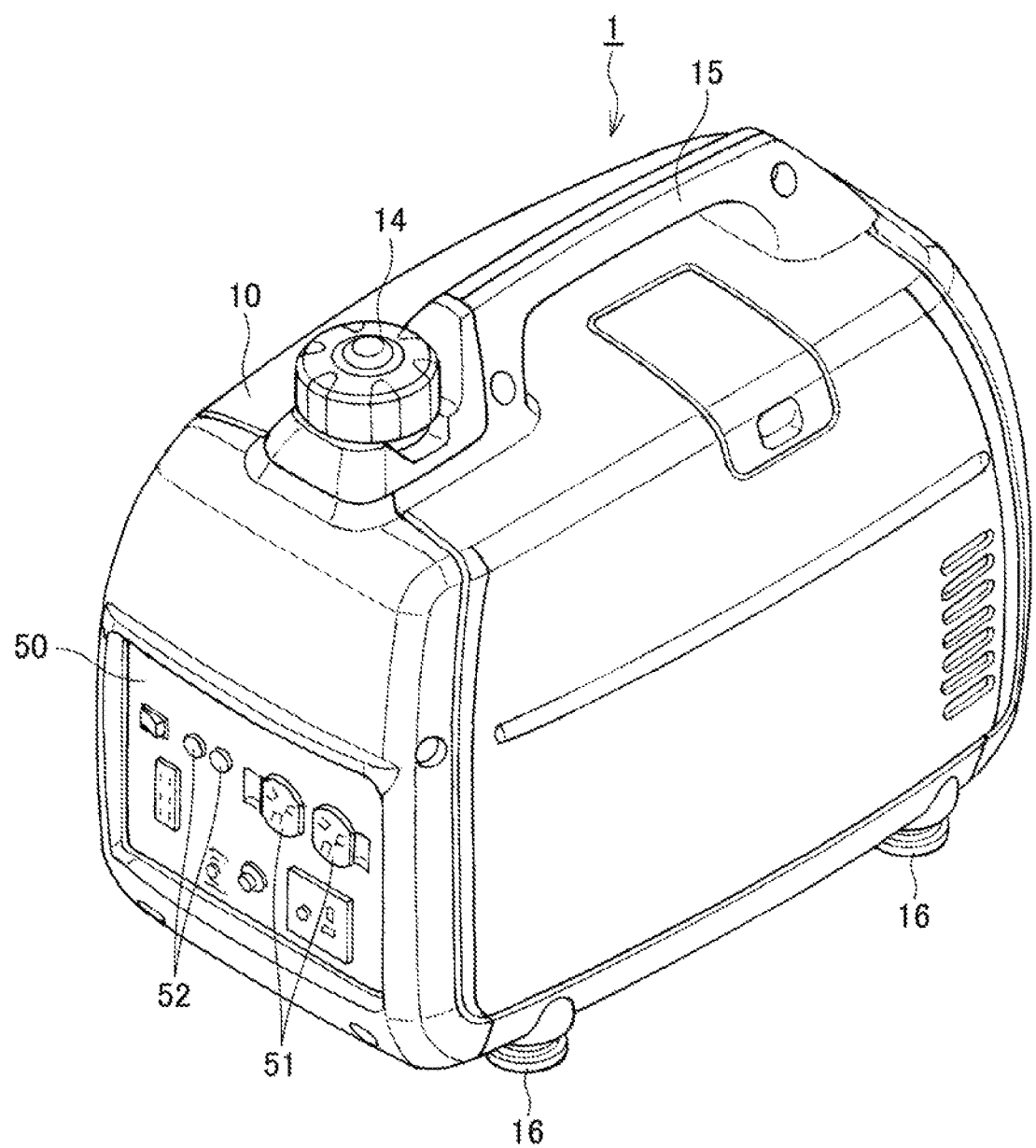
FIG. 1 is a perspective view showing a first embodiment of a power generator according to the present invention.
Figure 2:
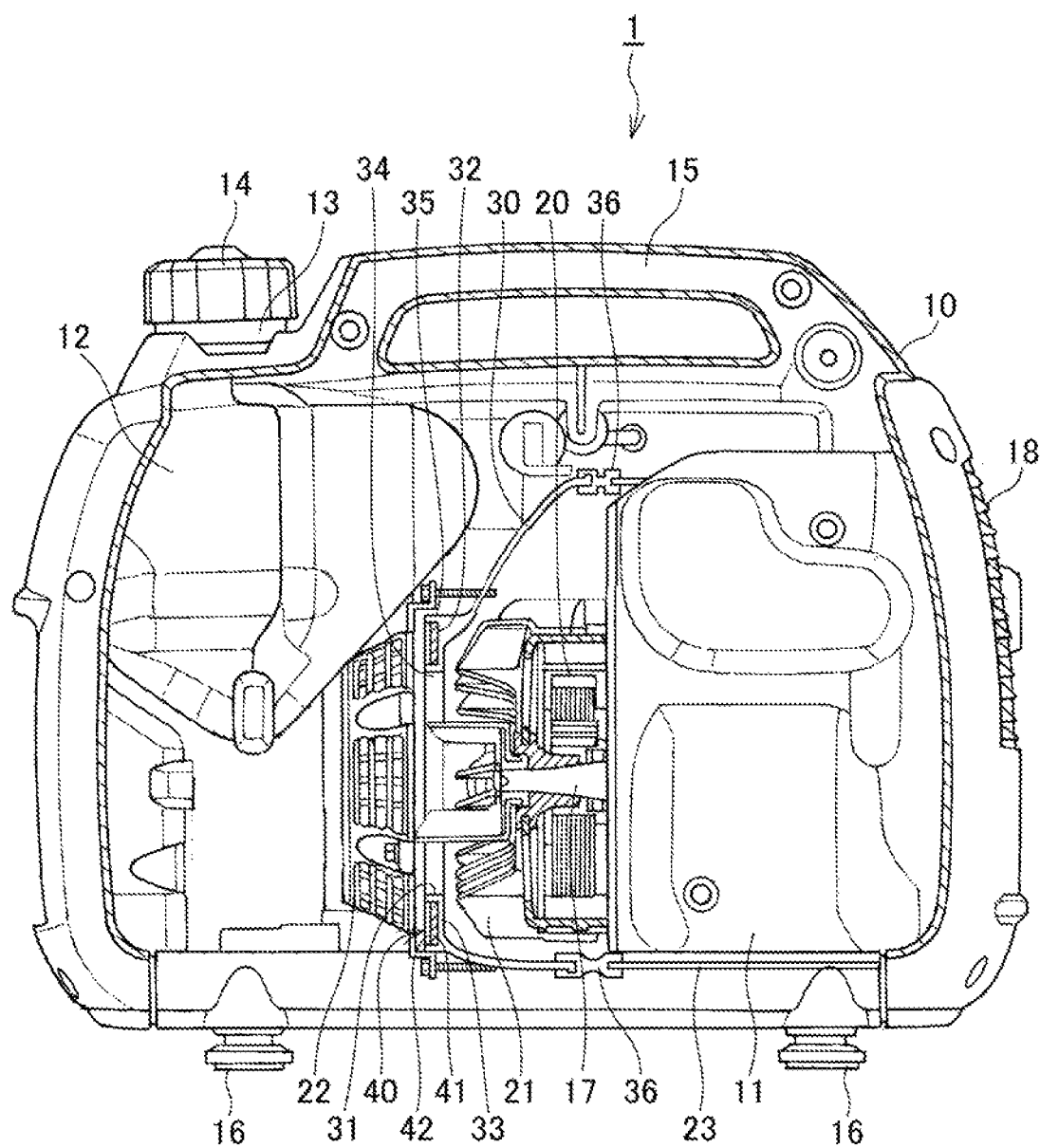
FIG. 2 is a cross-sectional view showing the power generator of the first embodiment.
Figure 3:
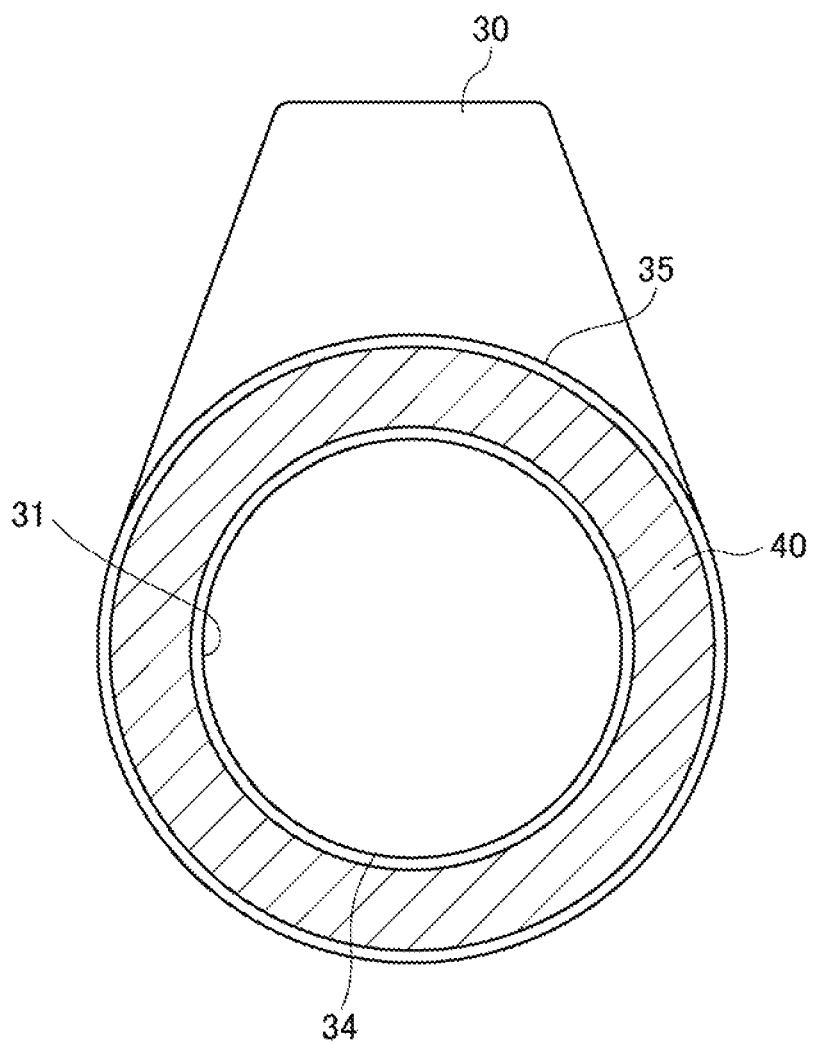
FIG. 3 is a front view showing a fan cover of the first embodiment.

FIG. 1 is a perspective view showing an appearance of a first embodiment of a power generator according to the present invention. FIG. 2 is a cross-sectional view of the power generator. FIG. 3 is a front view showing a fan cover of the first embodiment.

As shown in FIG. 1 and FIG. 2, in the first embodiment, a power generator 1 includes a substantially rectangular parallelepiped casing 10 made of a resin. An engine 11 is stored on a rear side (a right side in FIG. 2) in the casing 10. Furthermore, a fuel tank 12 is stored on a front side (a left side in FIG. 2) in the casing 10. In a top plate of the casing 10, a refueling port 13 of the fuel tank 12 is provided to protrude outwardly from the casing 10. A refueling cap 14 to open and close the refueling port 13 is removably attached to the refueling port 13.

Furthermore, a handle 15 is provided on an upper surface of the casing 10, and a plurality of legs 16 that support the casing 10 are attached to a lower surface of the casing 10.

An alternator 20 is attached to an output shaft 17 that protrudes forwardly from the engine 11, coaxially with the output shaft 17. Furthermore, a fan 21 is attached in front of the alternator 20 of the output shaft 17 and coaxially with the alternator.

A recoil 22 to start the engine 11 is disposed in front of the fan 21.

Furthermore, when the engine 11 is driven, the alternator 20 is rotated and driven to generate power. The fan 21 is also rotated and driven to take in air from an outer side of the casing 10 and to blow air toward the engine 11.

A shroud 23 via which the air blown by the fan 21 is guided to a periphery of the engine 11 is disposed inside the casing 10 and outside the engine 11.

A fan cover 30 that covers the alternator 20 and the fan 21 is disposed in a front end portion of the shroud 23. The fan cover 30 is formed in a tapered shape so that a front part has a smaller diameter, and a ventilating opening 31 is formed in a front end portion of the fan cover 30. The ventilating opening 31 is formed substantially concentrically with a rotary shaft of the engine 11.

The fan cover 30 is made of, for example, a metal having a high thermal conductivity, specifically aluminum, an aluminum alloy or the like.

Furthermore, in a circumferential edge portion of the ventilating opening 31 of the fan cover 30, an annular inverter supporter 32 is provided all around the ventilating opening 31. The inverter supporter 32 is monolithically formed with the fan cover 30. The inverter supporter 32 includes a support plate 33 extending in a direction orthogonal to the output shaft 17 of the engine 11, an inner wall 34 extending along an inner peripheral edge of the support plate 33, and an outer wall 35 extending along an outer peripheral edge of the support plate 33 outside the ventilating opening 31. Consequently, in FIG. 2, the inverter supporter 32 is formed to have a U-shaped cross section.

An inverter 40 is installed in the inverter supporter 32. The inverter 40 includes a substrate 41 constituting the inverter 40, and an element 42 mounted on the substrate 41.

The inverter 40 is installed in a state where the substrate 41 abuts on the support plate 33.

Furthermore, a vibration reduction member 36 made of an elastic material such as a rubber is provided between the fan cover 30 and the shroud 23.

Additionally, in the present embodiment, the recoil 22 is fixed to the fan cover 30 with bolts 37. Consequently, the recoil 22 is supported integrally with the fan cover 30.

Heretofore, the recoil 22 has been directly attached to the fan cover 30 via no vibration reduction member. Therefore, vibration of the engine 11 is transmitted to the recoil 22 via the shroud 23 and the fan cover 30, and hence, a space that allows the recoil 22 to vibrate needs to be acquired in the casing 10. However, in the present embodiment, the recoil 22 is attached to the fan cover 30 attached via the vibration reduction member 36, and hence, it is possible to reduce the vibration of the recoil 22.

A control panel 50 in which power outlets 51, operation buttons 52 and others are arranged is attached to a lower part of a front surface of the casing 10.

Furthermore, in a side plate of a portion of the front surface of the casing 10 below the control panel 50, an air intake port (not shown) to take outside air into the casing 10 is formed, and an exhaust port 18 is formed in a rear surface of the casing 10.

Then, the engine 11 is driven to drive and rotate the fan 21, thereby taking the outside air into the casing 10 through the air intake port. This air flows into the fan cover 30 via the ventilating opening 31, flows between the engine 11 and the shroud 23 to cool the engine 11, and is then exhausted to an outside through the exhaust port 18.

Next, an operation of the present embodiment will be described.

In the present embodiment, when the recoil 22 is operated to start the engine 11, the engine 11 is driven to rotate the output shaft 17, and the alternator 20 is driven to generate power.

Simultaneously, the output shaft 17 is rotated to drive and rotate the fan 21.

When the fan 21 is driven, the outside air is taken into the casing 10 through the air intake port, and this air flows into the fan cover 30 via the ventilating opening 31 of the fan cover 30. The air flowing into the fan cover 30 flows between the engine 11 and the shroud 23 to cool the engine 11, and is then exhausted to the outside through the exhaust port 18.

In this case, when the air taken from the outside flows through the ventilating opening 31, the air passes on an element 42 side of the inverter 40 installed in the inverter supporter 32. Consequently, it is possible to directly cool the element 42.

Furthermore, when passing through the ventilating opening 31, the air taken from the outside cools the fan cover 30. At this time, since the fan cover 30 is made of the material having the high thermal conductivity, it is possible to efficiently cool the whole fan cover 30 with the air passing through the ventilating opening 31.

Then, when the fan cover 30 is cooled, the inverter supporter 32 of the fan cover 30 is also cooled. Consequently, it is possible to cool the substrate 41 of the inverter 40 installed in the inverter supporter 32 by heat conduction of the fan cover 30.

As described above, in the present embodiment, the alternator 20 driven by the engine 11 to generate the power, the inverter 40 for the alternator 20, the fan 21 to cool the engine 11 and the shroud 23 via which the air blown by the fan 21 is guided to the periphery of the engine 11 are stored in the casing 10. The fan cover 30 that covers the alternator 20 and the fan 21 is provided in the end portion of the shroud 23. The ventilating opening 31 is formed in the end portion of the fan cover 30, and the inverter supporter 32 in which the inverter 40 is installed is provided in the circumferential edge portion of the ventilating opening 31.

In consequence, the air taken into the casing 10 by driving the fan 21 is directly applied to the inverter 40 to cool the inverter, and the inverter 40 can be efficiently cooled by the heat conduction of the fan cover 30 cooled by the air passing through the ventilating opening 31.

Furthermore, the inverter 40 is cooled by the inverter supporter 32 of the fan cover 30, and hence, a cooling fin to cool the inverter 40 as in a conventional technology is not required. The inverter 40 itself can be miniaturized, and the power generator 1 can be reduced in size and weight.

Additionally, the inverter 40 is installed in the inverter supporter 32 provided in the fan cover 30. Consequently, it is not necessary to acquire a space for exclusive use to install the inverter 40, and the power generator 1 can be reduced in size and weight.

Also in the present embodiment, the inverter supporter 32 is formed in an annular shape along the ventilating opening 31, and the inverter 40 is installed along a circumferential direction of the inverter supporter 32.

Consequently, the inverter 40 installed along the ventilating opening 31 can be efficiently cooled.

Furthermore, in the present embodiment, the vibration reduction member 36 made of the elastic material is provided between the fan cover 30 and the shroud 23.

Thus, the element 42, for example, a capacitor that is comparatively vulnerable to vibration is mounted in the inverter 40. However, when the vibration reduction member 36 is provided, the vibration of the engine 11 can be prevented from being transmitted to the inverter 40, and the element 42 mounted in the inverter 40 can be prevented from being damaged. Furthermore, since the fan cover 30 is attached to the shroud 23 via the vibration reduction member 36, radiated sound due to the transmission of the vibration of the engine 11 can be reduced.

Additionally, in the present embodiment, the recoil 22 to start the engine 11 is attached to the fan cover 30.

Thus, the recoil 22 is attached to the fan cover 30 in which the vibration is reduced by the vibration reduction member 36, and hence, vibration of the recoil 22 can be decreased. As a result, a space to allow for the vibration of the recoil 22 does not have to be provided, and the power generator 1 can be miniaturized. Furthermore, when the power generator 1 is miniaturized, a recoil rope (not shown) that operates the recoil 22 can be shortened, and the recoil rope can be easily handled.

Figure 4:
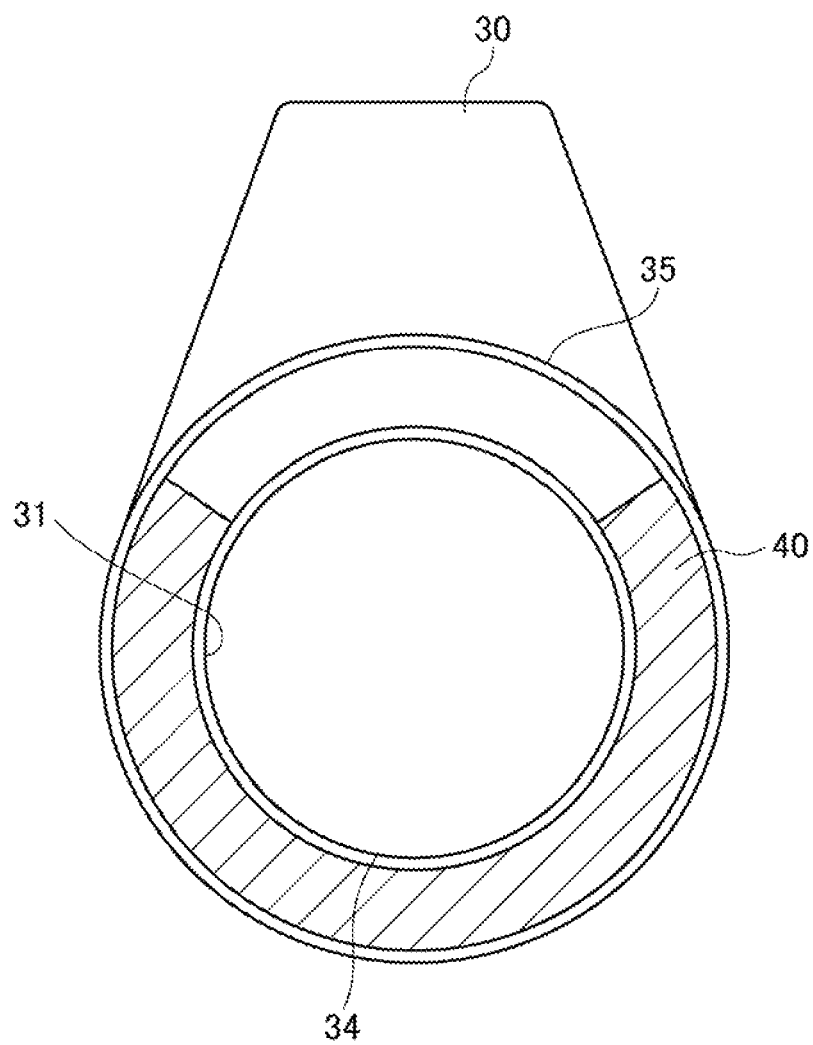
FIG. 4 is a front view showing a fan cover of a modification of the first embodiment.

Note that in the first embodiment, the inverter 40 is installed throughout a circumference of the inverter supporter 32, but the present invention is not limited to this embodiment. For example, as shown in FIG. 4, the inverter 40 may be installed in a part of the inverter supporter 32.

Next, description will be made as to a second embodiment of the present invention.

Figure 5:
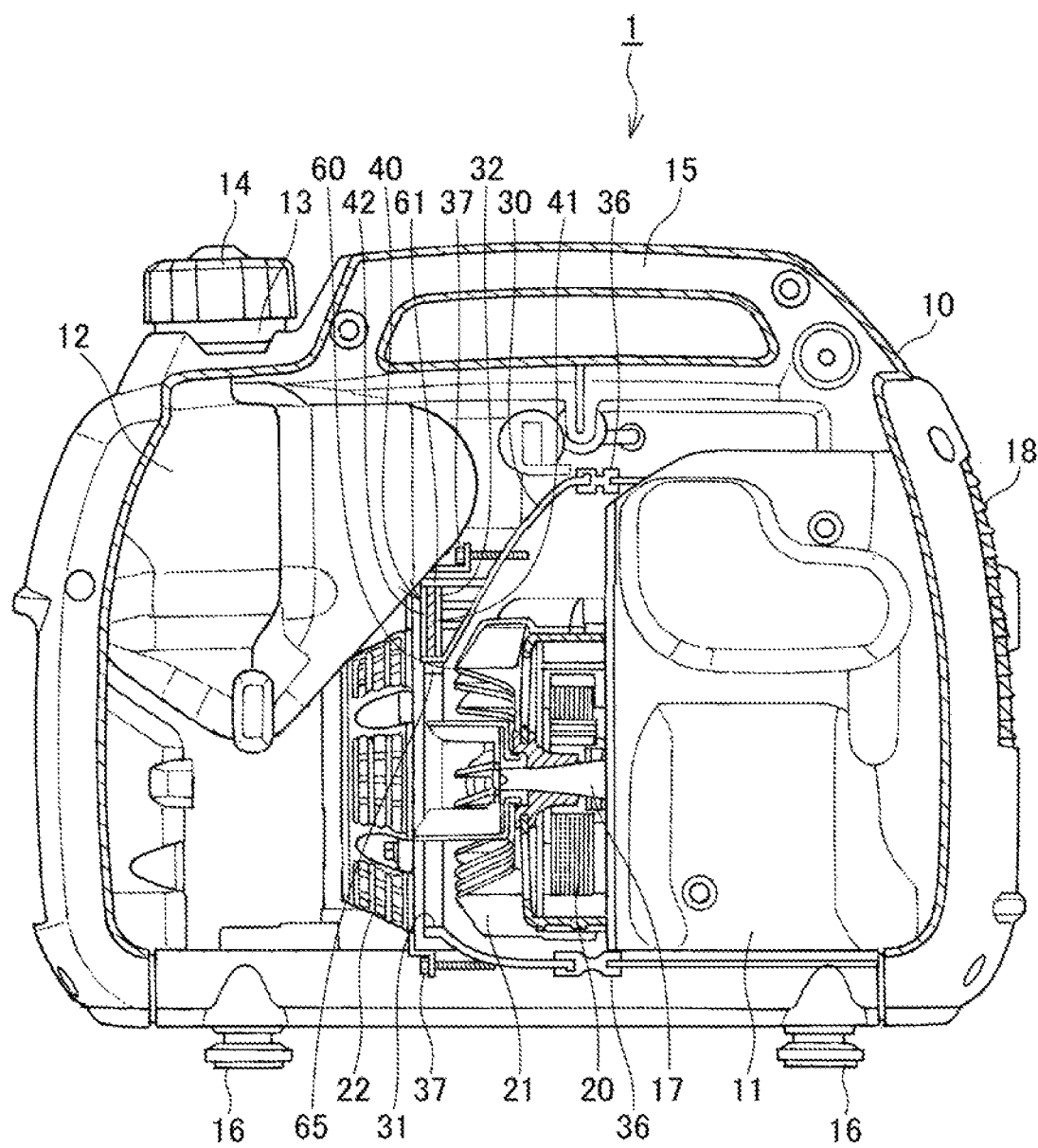
FIG. 5 is a cross-sectional view showing a power generator of a second embodiment.
Figure 6:
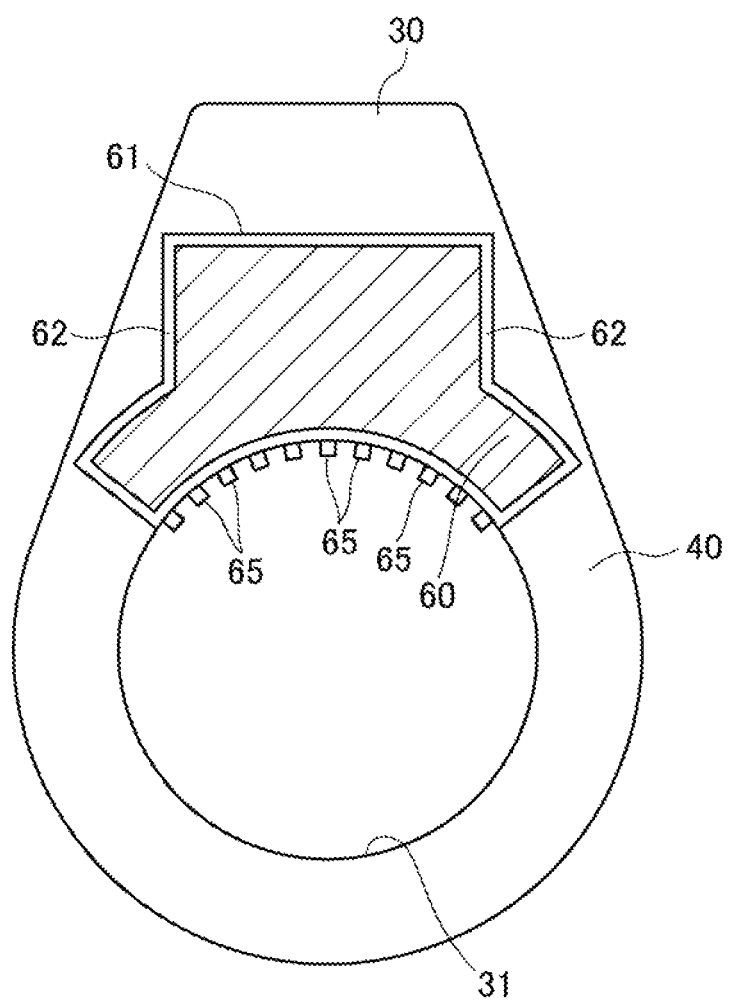
FIG. 6 is a front view showing a fan cover of the second embodiment.

FIG. 5 is a cross-sectional view of a power generator 1 showing the second embodiment of the present invention. FIG. 6 is a front view showing a fan cover 30 of the second embodiment.

As shown in FIG. 5 and FIG. 6, according to the present embodiment, an inverter supporter 32 is provided in a part of a ventilating opening 31.

Specifically, as shown in FIG. 6, the inverter supporter 32 is formed in a predetermined region on an upper side of the ventilating opening 31 of the fan cover 30. A lower edge 60 of the inverter supporter 32 has a shape along an inner edge of the ventilating opening 31, and an upper edge 61 of the inverter supporter 32 is substantially linearly formed with a predetermined space to the lower edge 60 of the inverter supporter 32. Both side edges 62 of the inverter supporter 32 have a shape in which both lower portions extend along the ventilating opening 31, and upper portions linearly extend in an up-down direction. However, the shape of the inverter supporter 32 is not limited to this example, and may be any shape as long as the predetermined region can be acquired.

Furthermore, in a region of an inner peripheral surface of the ventilating opening 31 which corresponds to a region where the inverter supporter 32 is formed, a plurality of cooling fins 65 are formed via a predetermined space in a circumferential direction of the ventilating opening 31. Note that the cooling fins 65 may be formed over an entire inner periphery of the ventilating opening 31.

Note that the cooling fins 65 may be formed in a region of, for example, an outer surface or an inner surface of the fan cover 30, not on the inner peripheral surface of the ventilating opening 31.

Another configuration is similar to the first embodiment, and hence, the same configuration as in the first embodiment is denoted with the same reference signs. Description thereof is omitted.

Next, description will be made as to an operation of the second embodiment.

In the present embodiment, an engine 11 is driven to rotate an output shaft 17. Consequently, a fan 21 is driven and rotated together with an alternator 20.

When the fan 21 is driven, outside air is taken into a casing 10 through an air intake port in the same manner as in the first embodiment. When this air flows through the ventilating opening 31, the air passes on an element 42 side of an inverter 40 installed in the inverter supporter 32. Consequently, it is possible to directly cool the element 42.

Furthermore, when the air taken in from an outside passes through the ventilating opening 31, the air cools the fan cover 30. The inverter supporter 32 of the fan cover 30 is also cooled. It is possible to cool a substrate 41 of the inverter 40 installed in the inverter supporter 32 by heat conduction of the fan cover 30.

Additionally, in the present embodiment, the cooling fins 65 are provided on the inner peripheral surface of the ventilating opening 31. Consequently, a contact area between the fan cover and the air passing through the ventilating opening 31 can be increased, and the fan cover 30 can be more efficiently cooled.

As described above, in the present embodiment, the inverter supporter 32 is formed in the region of a part of the ventilating opening 31 in the circumferential direction, and the inverter 40 is installed in the inverter supporter 32.

Consequently, also in the present embodiment, the air taken into the casing 10 is directly applied to the inverter 40 to cool the inverter in the same manner as in the first embodiment. Furthermore, the inverter 40 can be efficiently cooled by the heat conduction of the fan cover 30 cooled by the air passing through the ventilating opening 31.

Furthermore, since the inverter supporter 32 is formed in the region of the part, the substrate 41 of the inverter 40 can be formed in a shape close to a rectangle. Consequently, it is possible to easily design the substrate of the inverter 40.

Furthermore, the cooling fins 65 to cool the inverter 40 as in a conventional technology are not required. The inverter 40 itself can be miniaturized, and the power generator 1 can be reduced in size and weight.

Additionally, the inverter 40 is installed in the inverter supporter 32 provided in the fan cover 30. Consequently, a space for exclusive use to install the inverter 40 does not have to be acquired, and the power generator 1 can be reduced in size and weight.

Furthermore, in the present embodiment, the cooling fins 65 are provided on the inner peripheral surface of the ventilating opening 31.

Consequently, the contact area between the fan cover and the air passing through the ventilating opening 31 can be increased, and the fan cover 30 can be more efficiently cooled.

Note that the present invention is not limited to the description of the above embodiments, and can be variously modified and changed without departing from the gist of the present invention.

REFERENCE SIGNS LIST

1 power generator
10 casing
11 engine
12 fuel tank
17 output shaft
18 exhaust port
20 alternator
21 fan
22 recoil
23 shroud
30 fan cover
31 ventilating opening
32 inverter supporter
36 vibration reduction member
40 inverter
50 control panel
65 cooling fin

What is claimed is:

1. A power generator in which an alternator driven by an engine to generate power, an inverter for the alternator, a fan to cool the engine, and a shroud via which air blown by the fan is guided to a periphery of the engine are stored inside of a casing, wherein
   a fan cover that covers the alternator and the fan is provided in an end portion of the shroud, a ventilating opening is formed in an end portion of the fan cover, and an inverter supporter in which the inverter is installed is provided in a circumferential edge portion of the ventilating opening, wherein
   the fan cover is made of a metal having thermal conductivity,
   the inverter includes a substrate and an element mounted on the substrate,
   the inverter supporter is made of a metal having thermal conductivity, and is provided in the circumferential edge portion of the ventilating opening,
   the inverter supporter includes a support plate that is provided outside the ventilating opening, and that extends in a direction orthogonal to an output shaft of the engine, and
   the inverter is installed such that the substrate abuts on the support plate.

2. The power generator according to claim 1, wherein the inverter supporter is formed in an annular shape along the ventilating opening, and the inverter is installed along a circumferential direction of the inverter supporter.

3. The power generator according to claim 1, wherein the inverter supporter is formed in a region of a part of the ventilating opening in a circumferential direction.

4. The power generator according to claim 1, wherein a cooling fin is provided on an inner peripheral surface of the ventilating opening.

5. The power generator according to claim 1, wherein a vibration reduction member made of an elastic material is provided between the fan cover and the shroud.

6. The power generator according to claim 5, wherein a recoil to start the engine is attached to the fan cover.

7. The power generator according to claim 6, wherein the recoil is disposed apart from the inverter supporter.

* * * * *